(12) United States Patent
Belov et al.

(10) Patent No.: US 12,391,518 B2
(45) Date of Patent: Aug. 19, 2025

(54) CONTROL OF MULTIPLE DISPLAYS ASSOCIATED WITH AN ELEVATOR SYSTEM

(71) Applicant: KONE CORPORATION, Helsinki (FI)

(72) Inventors: Mika Belov, Helsinki (FI); Mikko Piironen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/367,365

(22) Filed: Sep. 12, 2023

(65) Prior Publication Data

US 2023/0416047 A1  Dec. 28, 2023

Related U.S. Application Data

(63) Continuation of application No. PCT/FI2021/050272, filed on Apr. 14, 2021.

(51) Int. Cl.
*B66B 3/00* (2006.01)
*G06F 3/14* (2006.01)

(52) U.S. Cl.
CPC ............ *B66B 3/002* (2013.01); *B66B 3/008* (2013.01); *G06F 3/1423* (2013.01)

(58) Field of Classification Search
CPC ........... B66B 1/461; B66B 1/468; B66B 3/00; B66B 3/002; B66B 3/008; B66B 3/1423; B66B 3/041
See application file for complete search history.

(56) References Cited

U.S. PATENT DOCUMENTS

| | | | | |
|---|---|---|---|---|
| 4,852,696 A | * | 8/1989 | Fukuda | B66B 3/008 187/394 |
| 5,679,934 A | * | 10/1997 | Juntunen | B66B 1/466 187/394 |
| 2012/0024638 A1 | * | 2/2012 | Poutiainen | B66B 1/463 187/395 |

(Continued)

FOREIGN PATENT DOCUMENTS

| | | |
|---|---|---|
| EP | 2396263 A1 | 12/2011 |
| EP | 3401258 A1 | 11/2018 |
| WO | WO 2007/132499 A1 | 11/2007 |

OTHER PUBLICATIONS

International Search Report, issued in PCT/FI2021/050272, PCT/ISA/210, dated Jan. 4, 2022.

(Continued)

*Primary Examiner* — Kenneth Bukowski
(74) *Attorney, Agent, or Firm* — Birch, Stewart, Kolasch & Birch, LLP

(57) ABSTRACT

A control system includes at least one processor and at least one memory including computer program code. The at least one memory and the computer program code is configured to, with the at least one processor, cause the control system to at least perform: controlling application contents displayed by a plurality of displays associated with an elevator system, each application content having an associated respective priority; obtaining a triggering event associated with the elevator system; and changing application content of at least one of the plurality of displays based on the triggering event and the priority associated with each of the application contents.

16 Claims, 3 Drawing Sheets

(56) References Cited

U.S. PATENT DOCUMENTS

| | | | | |
|---|---|---|---|---|
| 2014/0299421 A1* | 10/2014 | Hanvey | ................... | B66B 1/463 |
| | | | | 187/389 |
| 2016/0244295 A1* | 8/2016 | Salmikuukka | ........ | B66B 1/2458 |
| 2017/0297864 A1* | 10/2017 | Koivisto | ................. | G06F 3/017 |
| 2017/0305716 A1* | 10/2017 | Peterson | ................. | B66B 1/468 |
| 2017/0341903 A1* | 11/2017 | Adkins | ................... | B66B 1/463 |
| 2017/0355556 A1* | 12/2017 | Simcik | ................... | B66B 1/468 |
| 2018/0101873 A1* | 4/2018 | Cai | ................... | G06Q 30/0269 |

OTHER PUBLICATIONS

Written Opinion of the International Searching Authority, issued in PCT/FI2021/050272, PCT/ISA/237, dated Jan. 4, 2022.

* cited by examiner

CONTROL OF MULTIPLE DISPLAYS ASSOCIATED WITH AN ELEVATOR SYSTEM

BACKGROUND

Cross Reference to Related Applications

This application is a Continuation of PCT International Application No. PCT/FI2021/050272 filed on Apr. 14, 2021, which is hereby expressly incorporated by reference into the present application.

A car operating panel (COP) in an elevator car is a panel that enables user interaction for a passenger with an elevator system. For example, the COP may enable a car call, issuing an alarm, holding the elevator doors open etc. The car operating panel may comprise one or more displays, for example, for displaying the current floor or providing some additional information for passengers. An elevator car may also comprise one or more other displays that may be configured to display some additional information, for example, advertisements, video clips etc. Displays associated with the elevator system may be located also elsewhere in a building.

SUMMARY

According to a first aspect, there is provided a controller comprising at least one processor and at least one memory including computer program code. The at least one memory and the computer program code are configured to, with the at least one processor, cause the controller to at least perform: controlling application contents displayed by a plurality of displays associated with an elevator system, each application content having an associated respective priority; obtaining a triggering event associated with the elevator system; and changing application content of at least one of the plurality of displays based on the triggering event and the priority associated with each of the application contents.

In an implementation form of the first aspect, the triggering event comprises an elevator system status change.

In an implementation form of the first aspect, the elevator system status change comprises at least one of an elevator system status change and a change in an operation status of an elevator.

In an implementation form of the first aspect, a feature set defining one or more display properties is associated with each display of the plurality of displays, and wherein the at least one memory and the computer program code configured to, with the at least one processor, cause the control system to at least perform: changing the application content of at least one of the plurality of displays based on the triggering event, the priority associated with each of the application contents and the feature sets associated with the displays.

In an implementation form of the first aspect, the at least one memory and the computer program code configured to, with the at least one processor, cause the control system to at least perform: changing the application content of the at least one of the plurality of displays comprises causing display of the same application content in all displays of the plurality of displays.

In an implementation form of the first aspect, the plurality of displays are integrated into at least one of a car operating panel and a destination operating panel.

According to a second aspect, there is provided an elevator system comprising a plurality of displays associated with the elevator system, and the control system of the first aspect.

According to a third aspect, there is provided a method comprising: controlling, by a control system, application contents displayed by a plurality of displays associated with an elevator system, each application content having an associated respective priority; obtaining, by the control system, a triggering event associated with the elevator system; and changing, by the control system, application content of at least one of the plurality of displays based on the triggering event and the priority associated with each of the application contents.

In an implementation form of the third aspect, the triggering event comprises at least one of an elevator system status change and a change in an operation status of an elevator.

In an implementation form of the third aspect, the triggering event comprises a detection of a faulty display in the plurality of displays.

In an implementation form of the third aspect, a feature set defining one or more display properties is associated with each display of the plurality of displays, and wherein the method comprises: changing the application content of at least one of the plurality of displays based on the triggering event, the priority associated with each of the application contents and the feature sets associated with the displays.

In an implementation form of the third aspect, changing the application content of the at least one of the plurality of displays comprises causing display of the same application content in all displays of the plurality of displays.

In an implementation form of the third aspect, the plurality of displays are integrated into at least one of a car operating panel and a destination operating panel.

According to a fourth aspect, there is provided a computer program comprising instructions which, when the program is executed by the at least one processor of the control system of the first aspect, cause the control system to carry out the method of the third aspect.

According to a fifth aspect, there is provided a computer-readable medium comprising instructions which, when the program is executed by the at least one processor of the control system of the first aspect, cause the control system to carry out the method of the third aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
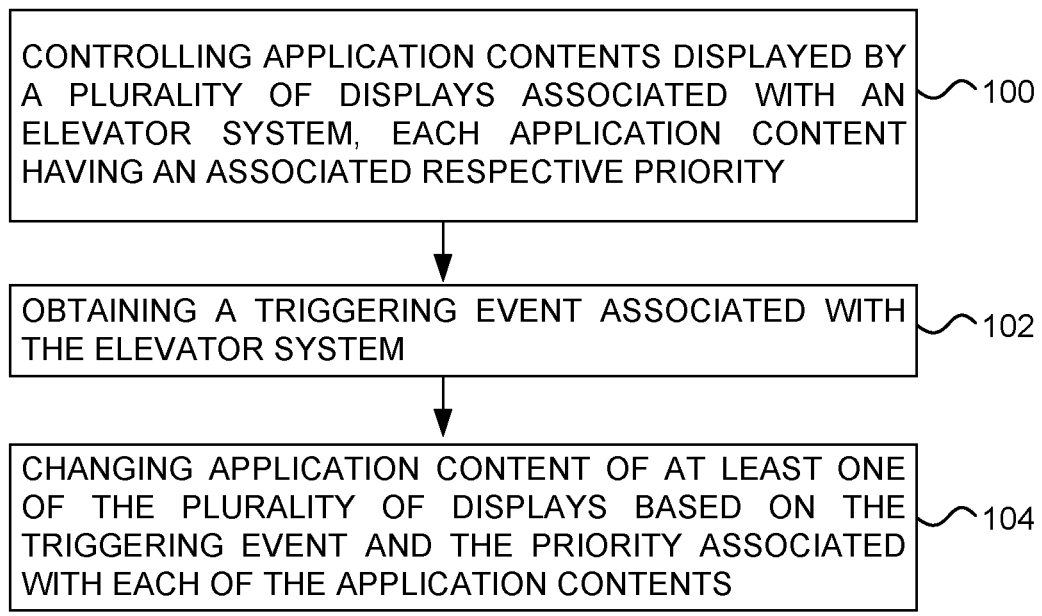
FIG. 1 illustrates a flow chart of a method for changing application content of a plurality of displays associated with an elevator system according to an example embodiment.

FIG. 1 illustrates a flow chart of a method for changing application content of a plurality of displays associated with an elevator system according to an example embodiment. The method may be performed, for example, by a control system in an elevator system, for example, by a controller or an elevator controller.

At 100 application contents displayed by a plurality of displays associated with an elevator system are controlled by the control system. The displays may be arranged, for example, in an elevator car as separate displays. Alternatively, the displays may be integrated, for example, into a car operating panel (COP) or they may located elsewhere in a building. A priority has been associated with application content. The priority associated with each application content may determine, for example, what application content is preferred over another in some situations. The term "application content" may relate to information content that is provided for some specific purpose. These application contents may comprise, for example, at least one of an emergency call, car operating panel operations, media content and digital information board etc.

At 102 a triggering event associated with the elevator system is obtained by the control system. The triggering event may be, for example, an elevator system status change, a change in an operation status of an elevator or detection of a faulty display, for example, in the elevator car or elsewhere in a building. These are only examples of possible triggering events and other triggering events may be applied. A common nominator for each triggering event is that each triggering event may have an effect on what information is to be displayed by the displays that may be arranged in the elevator car or elsewhere in the building.

At 104 application content of at least one of the plurality of displays is changed by the control system based on the triggering event and the priority associated with each of the application contents. This allows, for example, to prioritize important content on the displays in the elevator car in case of some predefined event having an effect on the displayed content occurs.

Figure 2:
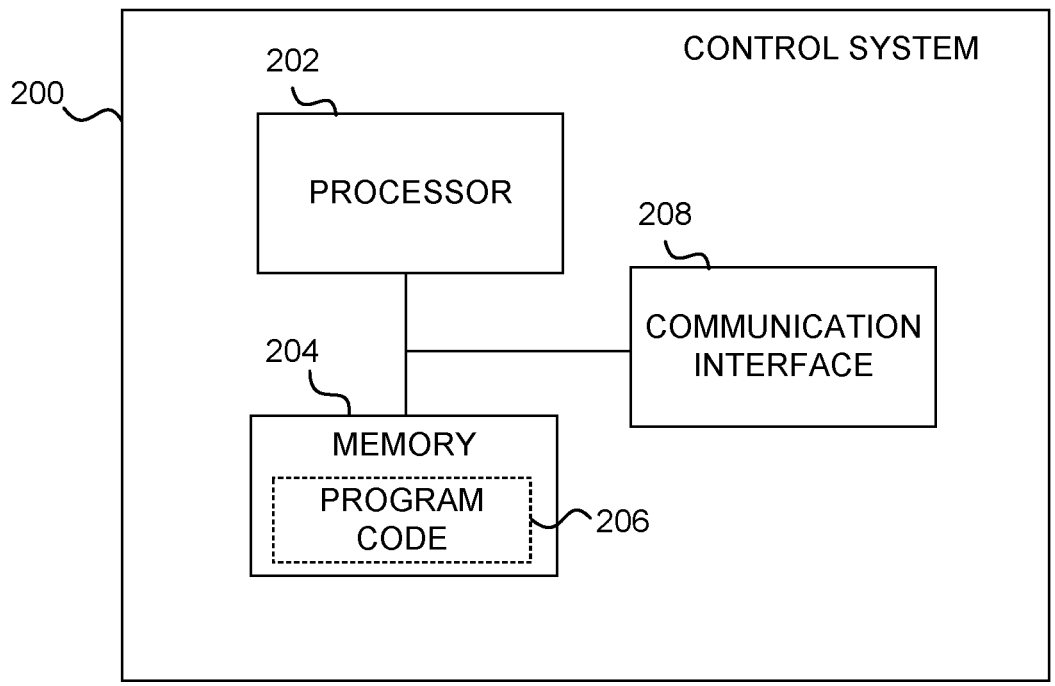
FIG. 2 illustrates a control system according to an example embodiment.

FIG. 2 illustrates a block diagram of a control system 200 according to an example embodiment. The control system 200 may be configured to implement the method discussed earlier in relation to FIG. 1. The control system 200 may refer to a controller or an elevator controller of an elevator system.

The controller 200 comprises one or more processors 202, and one or more memories 204 that comprise computer program code. The controller 200 may also include an input/output module (not shown in FIG. 2), and/or a communication interface 208. Although the apparatus 200 is depicted to include only one processor 202, the controller 200 may also include more than one processor. In an example embodiment, the memory 204 is capable of storing instructions, such as an operating system and/or various applications.

Furthermore, the processor 202 is capable of executing the stored instructions. In an example embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 202 may be configured to execute hard-coded functionality. In an example embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

In an embodiment, the at least one memory 204 may store program instructions 206 that, when executed by the at least one processor 202, cause the controller 200 to perform the functionality of the various embodiments discussed herein. Further, in an embodiment, at least one of the processor 202 and the memory 204 may constitute means for implementing the herein discussed functionality.

Figure 3A:
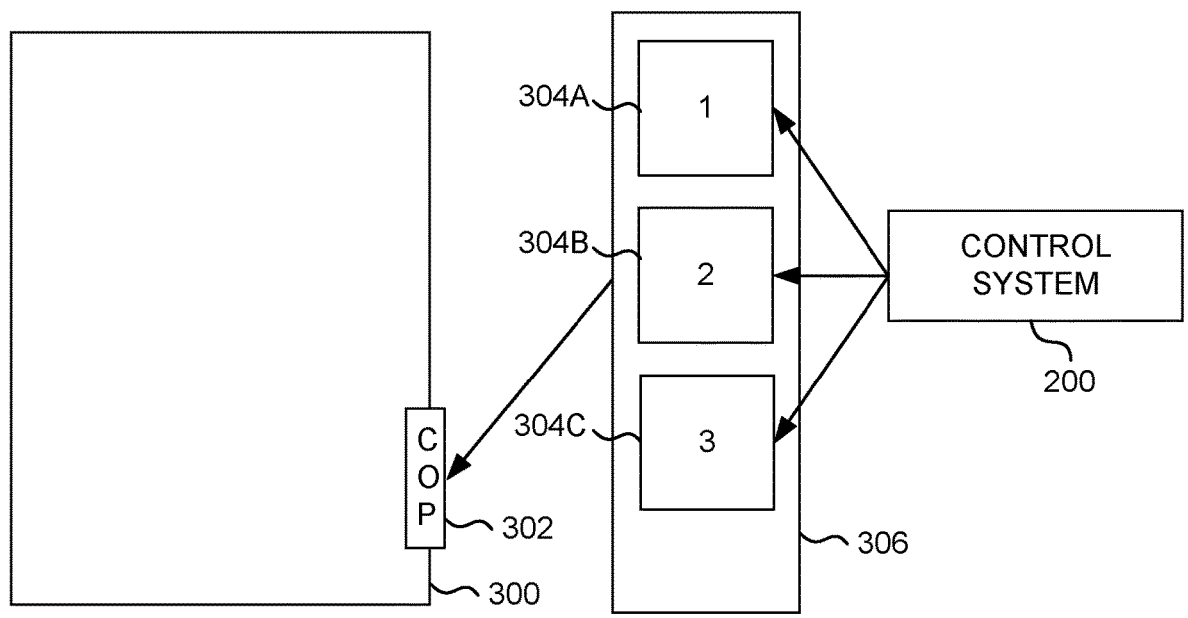
FIG. 3A illustrates a plurality of displays arranged in an elevator car according to an example embodiment.

FIG. 3A illustrates a plurality of displays 304A, 304B, 304C arranged in an elevator car 300 according to an example embodiment. Although the displays are in this example located in the elevator car, in other examples they may be arranged elsewhere in an elevator system.

Application contents displayed by the plurality of displays 304A, 304B, 304C arranged in the elevator car 300 of an elevator system are controlled by the control system 200. FIG. 3A illustrates an example in which three displays are integrated into a car operating panel 300. In another example embodiment, each display 304A, 304B, 304C may be arranged in the elevator car 300 as separate displays, or some of the displays may be integrated into the car operating panel 302 while one or more other displays may be arranged separately elsewhere in the elevator car 300. The reference 306 illustrates a side view of the car operating panel 302. Further, in an example embodiment, some or all of the car operating panel functions may be implemented using a touch-sensitive display.

Priority may be associated with each application content. The priority associated with each application content may determine, for example, what application content is preferred over another in some predefined situations. The term "application content" may relate to information content that is provided for some specific purpose. These application contents may comprise, for example, at least one of an emergency call, car operating panel operations, media content and digital information board etc.

Figure 3B:
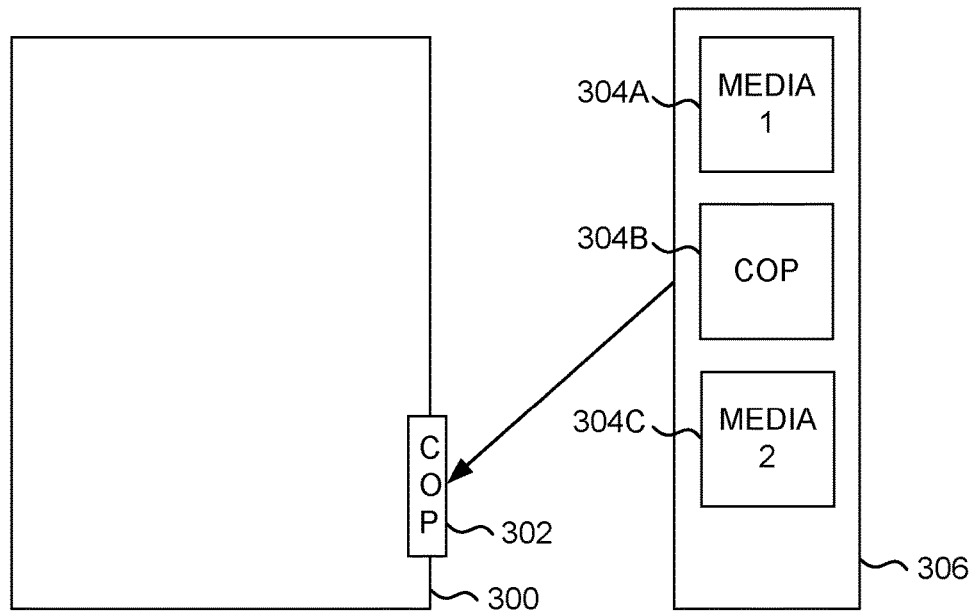
FIG. 3B illustrates a plurality of displays arranged in an elevator car according to another example embodiment.

FIG. 3B illustrates a plurality of displays 304A, 304B, 304C arranged in the elevator car 300 according to another example embodiment.

FIG. 3B illustrates a situation in which the displays 304A, 304B, 304C display application content in a normal operation state of the elevator car 300 or the elevator system. The displays 304A, 304C are configured to display some media content, for example, video clips or advertisements, while the display 304B is configured to provide car operation panel functionality. One or more of the displays 304A, 304B, 304C may be touch sensitive thus enabling user input via the displays.

Figure 3C:
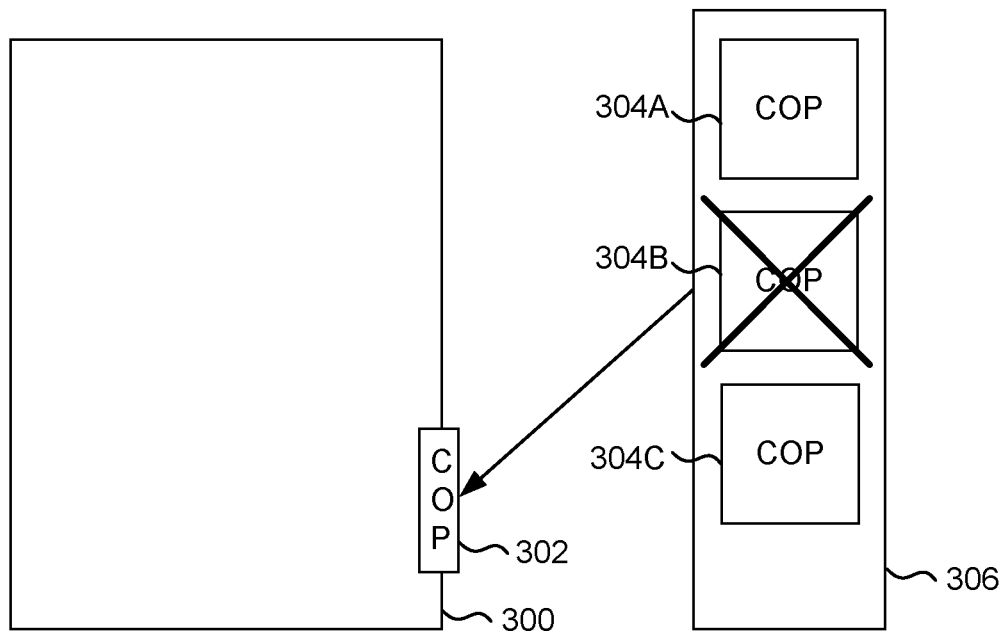
FIG. 3C illustrates a plurality of displays arranged in an elevator car according to another example embodiment.

FIG. 3C illustrates a plurality of displays 304A, 304B, 304C arranged in the elevator car 300 according to another example embodiment.

FIG. 3C illustrates a situation in which the display 304B becomes faulty. The control system 200 detects this and the detection triggers a determination of what application content is to be displayed on the remaining displays 304A, 304C. As the car operating panel functionality is critical for the operation of the elevator car 300, the control system 200 needs to reconfigure the application contents displayed on the displays 304A, 304C. In this example, the control system 200 is configured to control both of the displays 304A, 304C to present the car operating panel functionality. In an example embodiment, both displays 304A, 304C may display identical content, and thus a user may use either of the displays 304A, 304C to input commands. In another example embodiment, the functionality of the original car operating panel display 304B may be shared between the remaining displays 304A, 304C. In other words, the display 304A may enable a first set of functions and the display 304C may enable a different, a second set of functions.

Figure 3D:
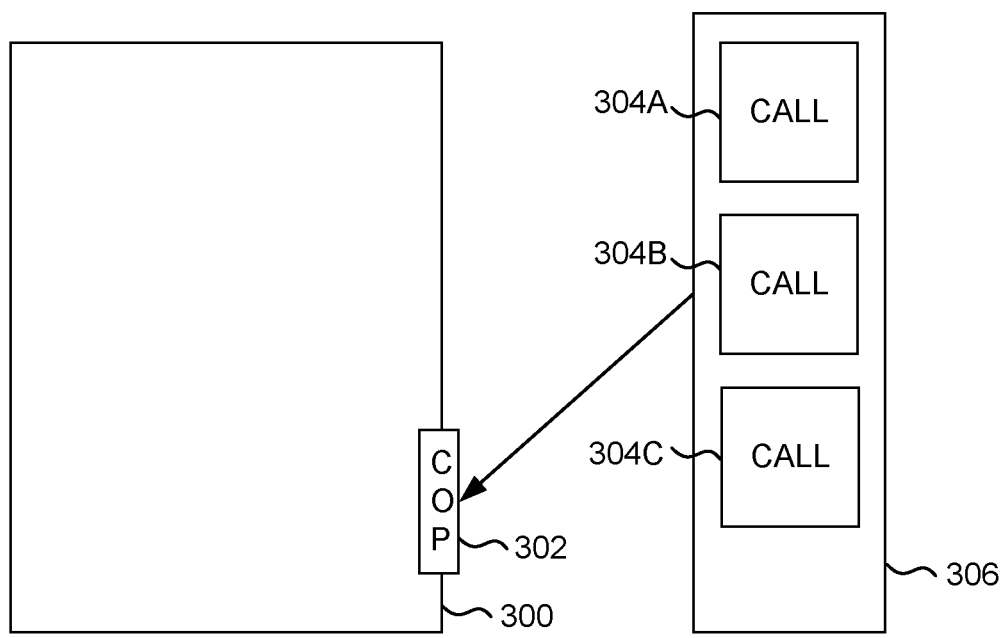
FIG. 3D illustrates a plurality of displays arranged in an elevator car according to another example embodiment.

FIG. 3D illustrates a plurality of displays 304A, 304B, 304C arranged in the elevator car 300 according to another example embodiment.

FIG. 3D illustrates a situation in which a trigger event associated with the elevator system is obtained by the control system 200. The trigger event may be, for example, a fire alarm that causes the control system 200 to change application content displayed on the displays 304A, 304B, 304C even if none of the displays 304A, 304B 304C has become faulty. In this example, the control system 200 is configured to display emergency call related content on each of the displays 304A, 304B, 304C.

In an example embodiment of any of FIGS. 3A, 3B, 3C and 3D, a feature set defining one or more display properties may be associated with each display 304A, 304B, 304C. A feature set of a display may comprise information, for example, relating to technical features and/or capabilities of the display. The feature set may comprise information, for example, about a camera location, a speaker location, touch functionality capability, accessibility (for example, vertical location), and minimum font size (for example, codes requirements). One or more of the feature sets may then be taken into account, when the control system 200 determines how to change the application contents displayed on the displays 304A, 304B, 304C.

The various examples and embodiments have been described above using displays arranged in an elevator car as an example. In other example embodiments, the displays may be arranged elsewhere. For example, the displays may be arranged in a destination car operating (DOP) panel, on a wall of a building etc.

The illustrated solution may enable a solution which application content on displays in an elevator car can be changed and prioritized in response to predefined trigger events. For example, the highest priority application may be configured to reserve all displays. Or, if one or more of the displays become faulty, some higher priority application may start using the display originally reserved for some other application content.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

The components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A control system comprising:
   at least one processor; and
   at least one memory including computer program code,
   wherein the at least one memory and the computer program code are configured to, with the at least one processor, cause the control system to at least perform:
   controlling application contents displayed by a plurality of displays associated with an elevator system, each application content having an associated respective priority, the plurality of displays including a first display being a car operating panel configured to display contents regarding an operating state of the elevator car, and a second display being configured to display a media content;
   obtaining a triggering event associated with the elevator system which has a higher priority than those of the contents regarding an operating state of the elevator car and the media content displayed by the plurality of displays; and
   changing the contents regarding the operating state of the elevator car displayed on the first display and the media content displayed on the second display, and causing a display of a same content regarding the triggering event on all displays of the plurality of displays based on the triggering event and the priority associated with each of the application contents, and
   wherein the triggering event is obtained when none of the plurality of displays has become faulty.

2. The control system of claim 1, wherein the triggering event comprises at least one of an elevator system status change and a change in an operation status of an elevator.

3. The control system of claim 2, wherein a feature set defining one or more display properties is associated with each display of the plurality of displays, and wherein the at least one memory and the computer program code are configured to, with the at least one processor, cause the control system to at least perform:
   changing the application content of at least one of the plurality of displays based on the triggering event, the priority associated with each of the application contents and the feature sets associated with the displays.

4. The control system of claim 2, wherein the at least one memory and the computer program code are configured to, with the at least one processor, cause the control system to at least perform:
   changing the application content of the at least one of the plurality of displays comprises causing display of the same application content in all displays of the plurality of displays.

5. The control system of claim 1, wherein a feature set defining one or more display properties is associated with each display of the plurality of displays, and wherein the at least one memory and the computer program code are configured to, with the at least one processor, cause the control system to at least perform:
   changing the application content of at least one of the plurality of displays based on the triggering event, the priority associated with each of the application contents and the feature sets associated with the displays.

6. The control system of claim 5, wherein the at least one memory and the computer program code configured to, with the at least one processor, cause the control system to at least perform:
   changing the application content of the at least one of the plurality of displays comprises causing display of the same application content in all displays of the plurality of displays.

7. The control system of claim 1, wherein the at least one memory and the computer program code are configured to, with the at least one processor, cause the control system to at least perform:
   changing the application content of the at least one of the plurality of displays comprises causing display of the same application content in all displays of the plurality of displays.

8. The control system of claim 1, wherein the plurality of displays are integrated into at least one of a car operating panel and a destination operating panel.

9. An elevator system comprising:
   a plurality of displays associated with the elevator system; and
   the control system of claim 1.

10. A method comprising the steps of:
    controlling, by a control system, application contents displayed by a plurality of displays associated with an elevator system, each application content having an associated respective priority, the plurality of displays including a first display being a car operating panel configured to display contents regarding an operating state of the elevator car, and a second display being configured to display a media content;
    obtaining, by the control system, a triggering event associated with the elevator system which has a higher priority than those of the contents regarding an operating state of the elevator car and the media content displayed by the plurality of displays; and
    changing, by the control system, the contents regarding the operating state of the elevator car displayed on the first display and the media content displayed on the second display, and causing a display of a same content regarding the triggering event on all displays of the plurality of displays based on the triggering event and the priority associated with each of the application contents,
    wherein the triggering event is obtained when none of the plurality of displays has become faulty.

11. The method of claim 10, wherein the triggering event comprises at least one of an elevator system status change and a change in an operation status of an elevator.

12. The method of claim 10, wherein a feature set defining one or more display properties is associated with each display of the plurality of displays, and wherein the method comprises the step of:
    changing the application content of at least one of the plurality of displays based on the triggering event, the priority associated with each of the application contents and the feature sets associated with the displays.

13. The method claim 10, wherein changing the application content of the at least one of the plurality of displays comprises causing display of the same application content in all displays of the plurality of displays.

14. The method of claim 10, wherein the plurality of displays are integrated into at least one of a car operating panel and a destination operating panel.

15. A computer program comprising instructions which, when the program is executed by at least one processor of a control system comprising the at least one processor and at least one memory causes the control system to carry out the method of claim 10.

16. A non-transitory computer-readable medium comprising instructions which, when a program is executed by at least one processor of a control system comprising the at least one processor and at least one memory causes the control system to carry out the method of any of claim 10.

\* \* \* \* \*